United States Patent [19]

Rutschmann et al.

[11] Patent Number: 5,495,834
[45] Date of Patent: Mar. 5, 1996

[54] MULTI-CYLINDER INTERNAL-COMBUSTION ENGINE AIR INTAKE SYSTEM

[75] Inventors: Erwin Rutschmann, Tiefenbronn; Wolfgang Horlacher, Gerlingen, both of Germany

[73] Assignee: Dr. Ing. h.c.F. Porsche AG, Germany

[21] Appl. No.: 380,663

[22] Filed: Jan. 30, 1995

[30] Foreign Application Priority Data

Jan. 29, 1994 [DE] Germany .......................... 44 02 717.6

[51] Int. Cl.$^6$ .................................................. F02M 35/10
[52] U.S. Cl. ................................. 123/184.31; 123/184.57
[58] Field of Search ....................... 123/184.31, 184.53, 123/184.55, 184.57

[56] References Cited

U.S. PATENT DOCUMENTS

| | | | |
|---|---|---|---|
| 4,543,918 | 10/1985 | Ma | 123/184.42 |
| 4,622,926 | 11/1986 | Rutschmann et al. | 123/184.57 |
| 4,641,610 | 2/1987 | Rutschmann | 123/184.57 |
| 4,890,586 | 1/1990 | Fujii et al. | 123/184.55 |
| 5,092,284 | 3/1992 | Yamada | 123/184.55 |
| 5,143,026 | 9/1992 | Brüstle et al. | 123/184.55 |

FOREIGN PATENT DOCUMENTS

| | | | |
|---|---|---|---|
| 0158008A2 | 10/1985 | European Pat. Off. | |
| 0265960A2 | 5/1988 | European Pat. Off. | |
| 3820674A1 | 12/1989 | Germany | |
| 63-12822 | 1/1988 | Japan | 123/184.55 |
| 63-117120 | 5/1988 | Japan | 123/184.55 |
| 64-46492 | 9/1990 | Japan | 123/184.55 |
| 2-252961 | 10/1990 | Japan | |
| 5-280349 | 10/1993 | Japan | 123/184.31 |

*Primary Examiner*—David A. Okonsky
*Attorney, Agent, or Firm*—Evenson, McKeown, Edwards & Lenahan

[57] ABSTRACT

Two-bank internal-combustion engine, per cylinder bank air intake system has, per cylinder bank, one resonance container and, centered thereto, has another container. By way of suction pipes, the resonance containers are connected to the cylinders and are provided with connecting pipes among one another, with fresh air entering into one of these. Suction pipe extensions are connected to the other containers, and extend partially in the resonance containers while being aligned at a distance with the inflow funnels of the suction pipes. The combination of the connecting pipes acting as a resonance pipe with the suction pipe extensions acting as a ram pipe causes a mean pressure increase, whereby the torque as well as the power of the internal-combustion engine are increased.

20 Claims, 5 Drawing Sheets

MULTI-CYLINDER INTERNAL-COMBUSTION ENGINE AIR INTAKE SYSTEM

BACKGROUND AND SUMMARY OF THE INVENTION

The present invention relates to an air intake system of a multi-cylinder internal-combustion engine, comprising two cylinder tanks, cylinders of one respective cylinder bank being connected by suction pipes to a respective resonance container associated therewith, the resonance containers being combined by a connecting pipe and having suction pipe extensions extending in sections inside the respective resonance containers with sliding sleeves which, as a function of operating parameters of the internal-combustion engine, are adjustable between inlet openings of the suction pipes from a first spaced position into a second non-spaced position.

The air intake system of unpublished DE-P 43 15 129.9-13 exemplifies increasing the mean pressure over the whole rotational speed range. Thus, an increased amount of fresh air is supplied to each cylinder which causes a clear improvement of the volumetric efficiency.

It is an object of the present invention to optimize and improve this known air intake system constructionally and with respect to manufacturing techniques while maintaining good functioning thereof.

This object has been achieved according to the present invention by providing that a plurality of sliding sleeves of one cylinder bank are combined to form a constructional unit configured to cooperate with an adjusting device, and the sliding sleeves surround the suction pipe extension sections configured as inserts.

The principal advantages achieved with the present invention are that the sliding sleeves are assigned to a constructional unit which is easy to manufacture. Thus, the sliding sleeves, according to their function, surround the inserts which are integrated into the air intake system and have a simple construction. The tolerance-compensating holding of the inserts ensures a good functioning of the sliding sleeves. The fastening of the respective insert on the housing of the air intake system by way of a collar and a snap ring is cost effective and operationally reliable. The operational reliability is also promoted by the special pairing of materials. That is, the housing and the sliding sleeves are made of aluminum alloy, and the inserts are made of iron-metallic material, such as thin sheet metal. The adjusting device is applied in a center of gravity line of the constructional unit, to achieve favorable operating conditions. Finally, the slot opening of the lever and the cylindrical pin of the constructional unit represent a transmission element which is easy to implement but is highly effective.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
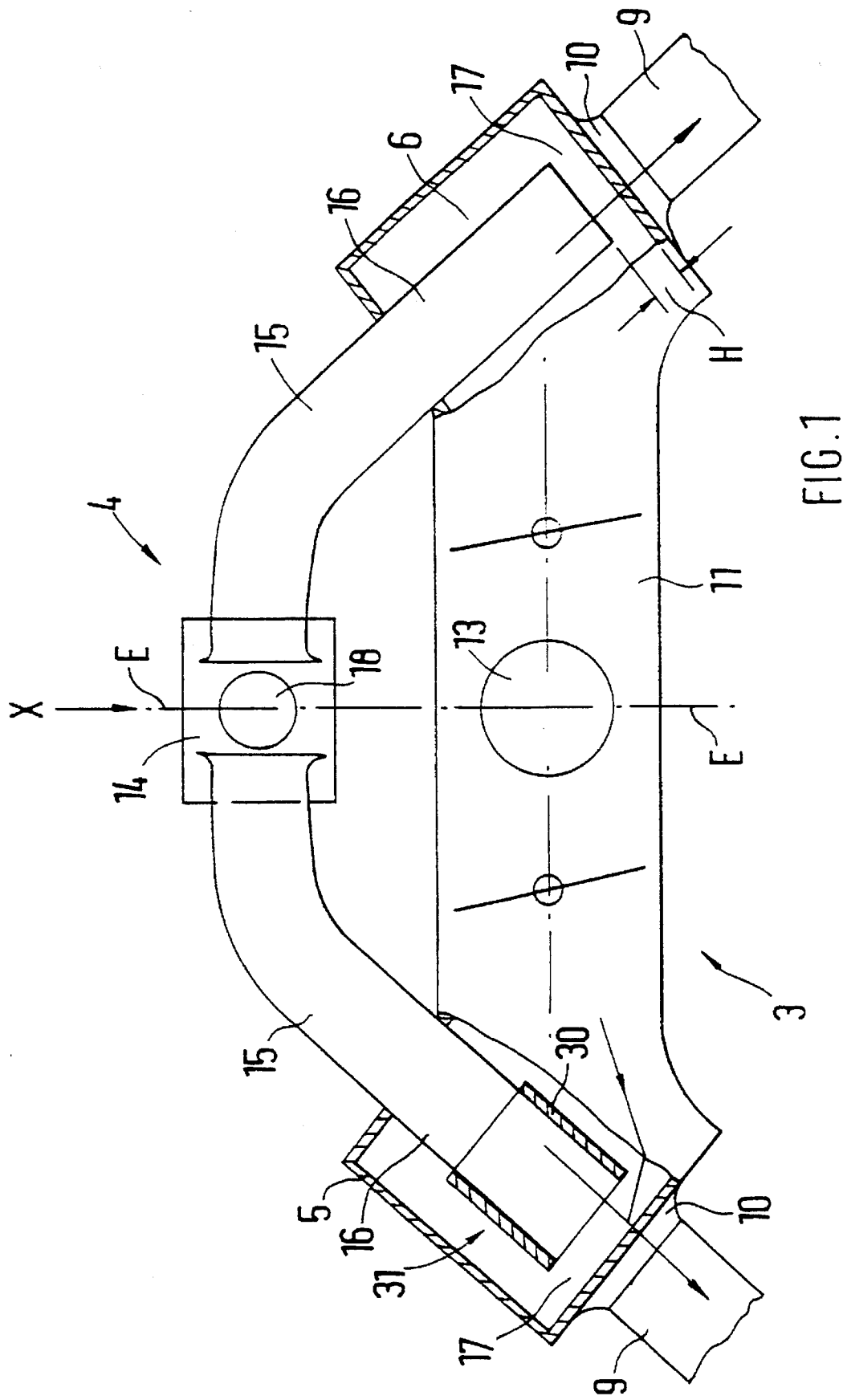
FIG. 1 is a partially sectional lateral view of a first embodiment of the air intake system with a modification in the left half.
Figure 2:
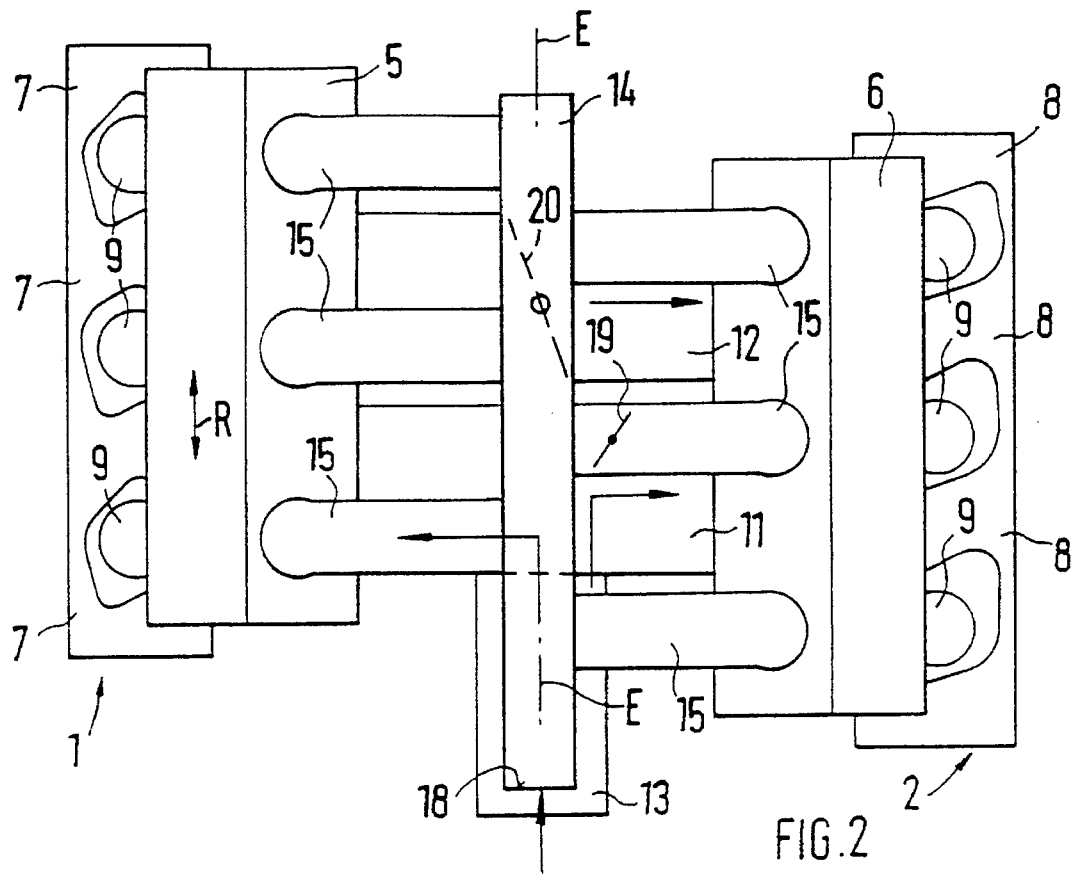
FIG. 2 is a top view in the direction of the arrow X of FIG. 1.
Figure 4:
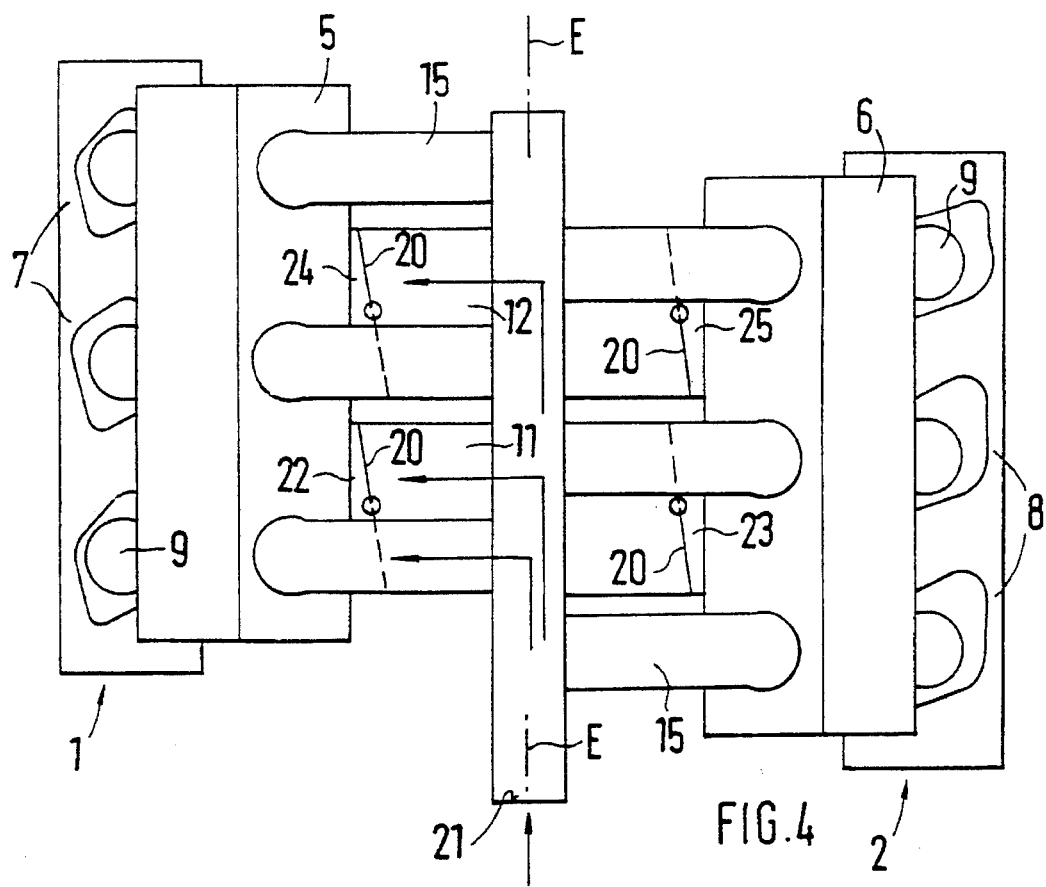
FIG. 4 is a top view in the direction of the arrow Y of to FIG. 3.

Referring now to FIGS. 1 and 2, an internal-combustion engine with two cylinder banks 1, 2 comprises an air intake system consisting of a two-chamber resonance system designated generally by numeral 3 and a single-chamber ram pipe system designated generally by numeral 4. The resonance system 3 comprises resonance containers 5, 6 which are assigned to the cylinder banks 1, 2 and to which individual suction pipes 9 are connected by inflow funnels 10. The suction pipes 9 lead to the cylinders 7, 8 of the internal-combustion engine as seen in FIG. 2.

Furthermore, two connecting pipes 11, 12 are connected to the resonance containers 5, 6, and air is fed to one connecting pipe 11 by way of a fresh air inlet 13.

Approximately in the center between the resonance containers 5, 6 situated in a plane of symmetry E—E, a container 14 is arranged which extends in its largest dimension along a longitudinal direction designated by the double arrow R (FIG. 2) of the cylinder banks 1, 2. Suction pipe extensions 15 are connected to this container 14 on both sides and are provided with cylindrical suction pipe extension sections 16 which extend inside the resonance containers 5, 6. Together with the container 14, the suction pipe extensions 15 form a single-chamber ram pipe system. Sections 16 are arranged in a spaced and coaxially aligned manner with respect to the inflow funnels 10 with the resulting distance H defining an annular gap 17.

FIG. 1, of which at this time only the part is relevant which is on the right of plane E—E, illustrates a first variation of the present invention. The container 14 has a fresh air inlet 18. Through this fresh air inlet 18 and the other fresh air inlet 13, air flows are taken into the system. By way of the annular gap 17, air reaches the cylinders 7, 8 through the connecting pipes 11, 12 acting as resonance pipes as well as by way of suction pipe extensions 15 acting as ram pipes.

The center extension 15 of the suction pipe extensions has a controllable throttle valve 19 as seen in FIG. 2. This suction pipe extension 15 acts as an additional resonance pipe at defined rotational speeds and therefore contributes to a torque increase. A controllable throttle valve can be provided for the further targeted connection of the other connecting pipe 12.

Figure 3:
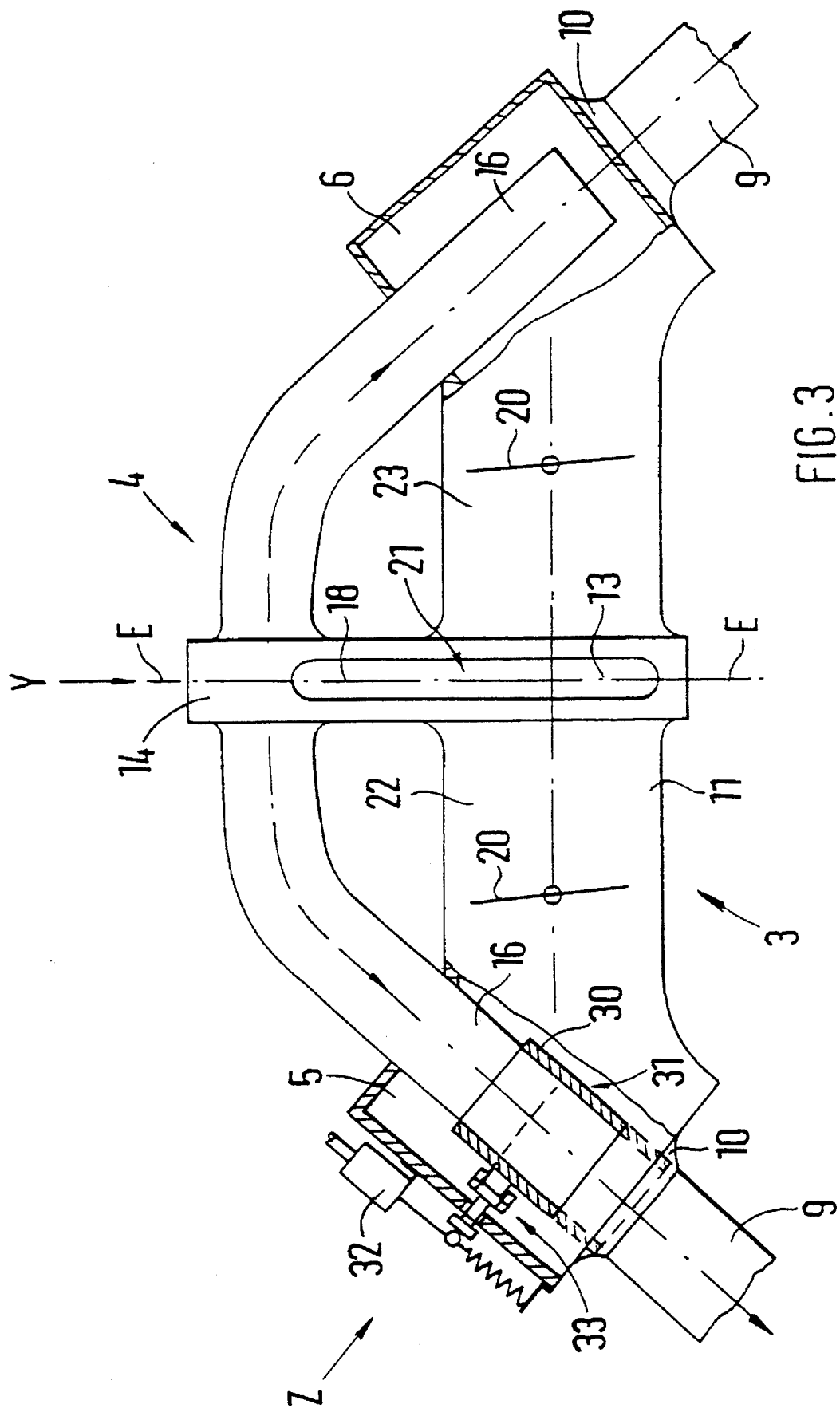
FIG. 3 is a view similar to FIG. 1 but of another embodiment of the present invention.

In a second variation according to FIG. 3, the first and the other fresh air inlet 13, 18, respectively, are arranged together in an inlet opening 21 of the container 14 which extends in a disk-shape manner in the plane E—E. The connecting pipes 11, 12 are of divided construction such that each partial pipe piece 22, 23, 24, 25 extends between a resonance container 5, 6 and the container 14, and each has a controllable throttle valve 20.

In the left of the plane of symmetry of FIGS. 1 and 3, modifications of the respective variations are shown with a sliding sleeve 30 slidably displaceable on section 16. An adjusting mechanism is illustrated in FIG. 3. The sliding sleeves 30, which can he arranged in resonance containers 5, 6, are each combined to form a constructional unit 31 which, in a manner known per se and therefore not described in further detail, can be displaced while bridging the annular gap 17 by way of a control element which, for example, is constructed as a pneumatic pressure element 32 and a linkage 33.

In the case of a first rotational speed range of up to approximately 5,000 rpm, a high torque is achieved by long suction pipes and a relatively small overall volume of the air intake system. For this speed range, the pressure element 32 places the constructional unit 31 in the position drawn by an interrupted line in FIG. 3 which closes the annular gap 17. When the resonance containers 5, 6 are uncoupled, incoming air will now arrive in the suction pipes 9 exclusively by way of the fresh air inlet 18 and the connected suction pipe extension 15. When a second rotational speed range between 5,000–7,000 r.p.m. is reached, the pressure element 32 places the constructional unit 31 in the position of the sliding sleeve 30 illustrated by soli lines in FIGS. 1 and 3. Then, with the interposition of the resonance containers 5, 6 as well as by way of connecting pipes 11, 12 which can be connected in steps as well as by way of the sections 16, fresh air taken in will reach the annular gap 17.

Figure 5:
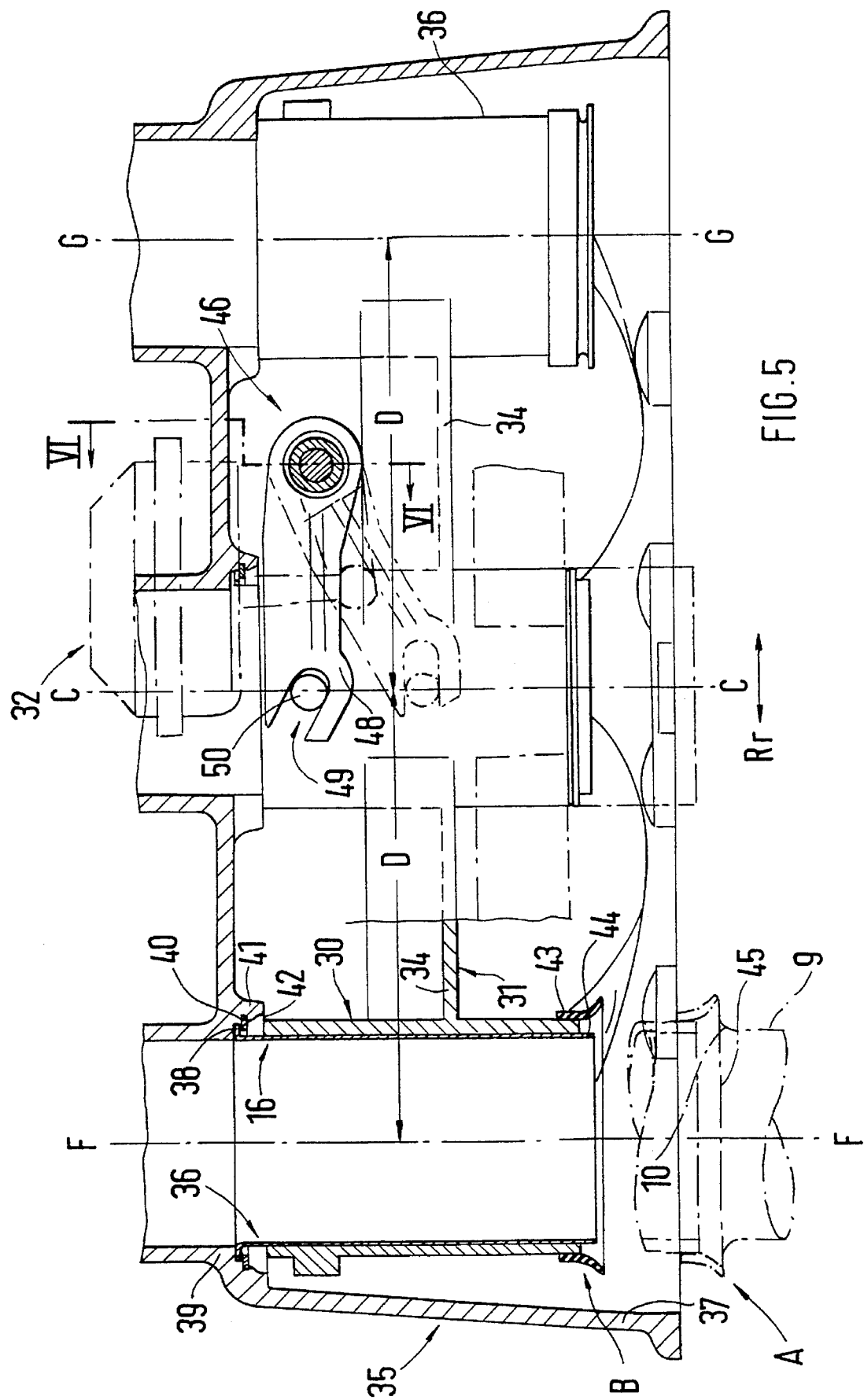
FIG. 5 is an enlarged view in the direction of the arrow Z of FIG. 3.

As seen in FIG. 5, the constructional unit 31 consists of a light-metal alloy and formed by the sliding sleeves 30 is formed in one piece. The cylindrical sliding sleeves 30 are connected with one another by webs 34. Of course, it is also possible to produce the constructional unit 31 from a plastic material and a similar selection of materials is also possible for an air intake system 35 which surrounds the constructional unit 31.

The suction pipe extension sections 16 are constructed as separate inserts 36 which are inserted into a housing 37, which can be made, for example, of a light metal alloy, a plastic material or the like, of the air intake system 35, so that they compensate tolerances in the radial direction shown by the double arrow Rr. This ensures that the constructional unit 31 can be operated in a trouble-free manner between positions A (dot-dash lines) and B (solid lines). For this purpose, each insert 36, which may be made of thin-walled sheet steel, extends by way of a collar 38 to a suction pipe section 39 of the housing 37. There, the collar 38 is held in position by a snap ring 40 which causes a form closure. In the area of the collar 38, the suction pipe section 39 has a thickened portion 41 which, on one hand, accommodates the snap ring 40 and, on the other hand, is used as a stop 42 for the sliding sleeve 30 in position B (solid lines). The side of the sliding sleeve 30 facing the suction pipe 9 has a sealing body 43 which in position A (dot-dash lines), thus in the non-spaced position of the sliding sleeve 30, is connected by a sealing lip 44 in a flow-tight manner to the inlet funnel 10 of an adjacent suction pipe connection 45 of the suction pipe 9.

The adjusting device designated generally by numeral 46 is constructed as a pressure element 32 and can also be a solenoid valve which is fastened to the housing 37. The device 46 is applied in a plane C—C, i.e., the center of gravity line, which extends parallel at a distance D with respect to both center lines F—F, G—G of the inserts 36, to achieve an approximate state of equilibrium of the constructional unit 31.

Figure 6:
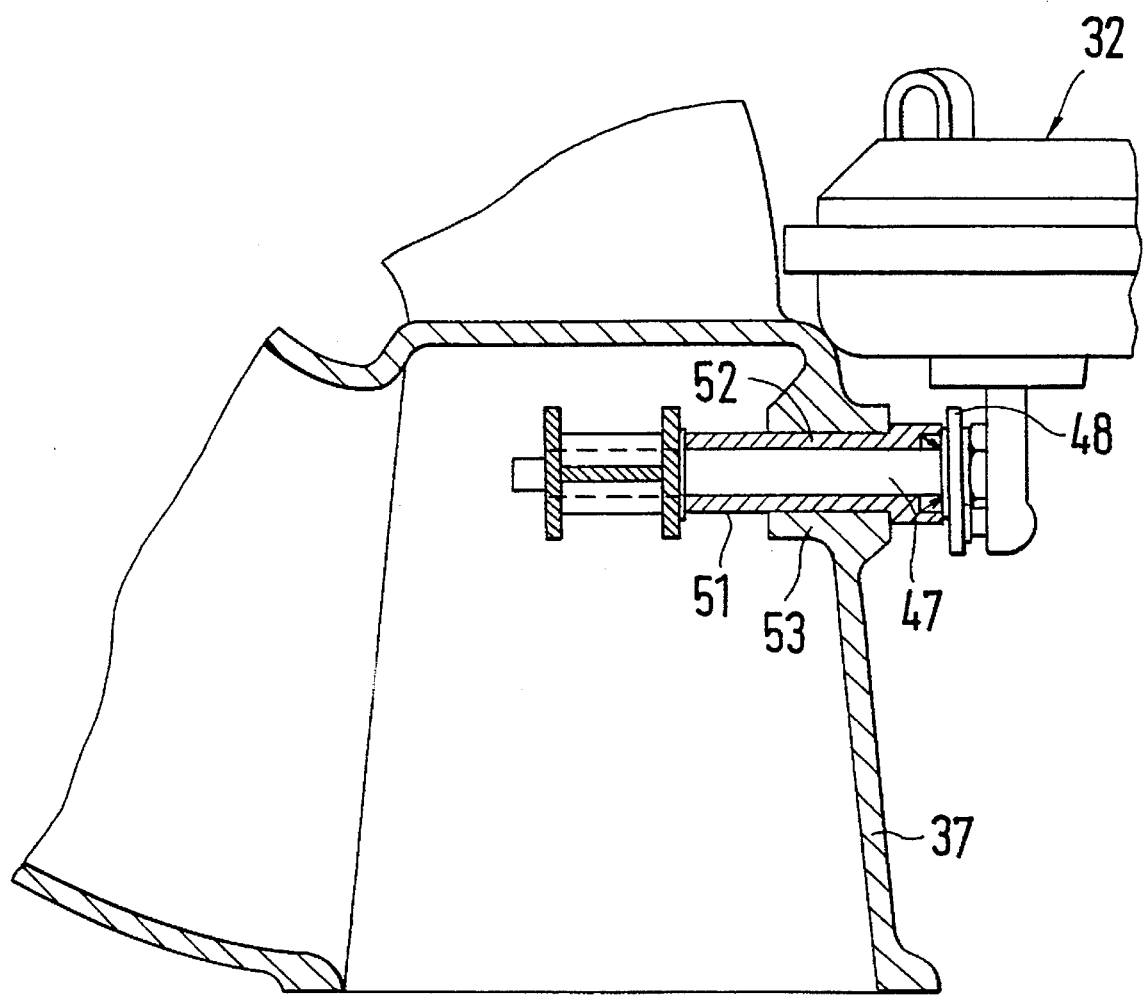
FIG. 6 is a sectional view along line VI—VI of FIG. 5.

The adjusting device 46 further comprises, as seen in FIG. 6, a rotating shaft 47 having a lever 48 which surrounds a cylindrical pin 50 of the constructional unit 31 via a slot opening 49. The rotating shaft 47 is arranged inside a bearing bush 51 which is fastened in a bore 52 of a bearing thickening 53 of the housing 37.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Air intake system of a multi-cylinder internal-combustion engine, comprising two opposite cylinder banks, cylinders of one respective cylinder bank being connected by suction pipes to a respective resonance container associated therewith, the resonance containers being combined by a connecting pipe and having suction pipe extensions extending in sections inside the respective resonance container with sliding sleeves which, as a function of operating parameters of the internal-combustion engine, are adjustable between inlet openings of the suction pipes from a first spaced position into a second non-spaced position, wherein a plurality of sliding sleeves of one cylinder bank are combined to form a constructional unit configured to cooperate with an adjusting device, and the sliding sleeves surround the suction pipe extension sections configured constructed as inserts.

2. The air intake system according to claim 1, wherein the inserts are held on a housing of the air intake system and are arranged to compensate for tolerances in a radial direction.

3. The air intake system according to claim 1, wherein the inserts extend via a collar to a suction pipe section of the housing and the collar is held in position by holding elements to affect a form closure.

4. The air intake system according to claim 3, wherein the inserts are held on a housing of the air intake system and are arranged to compensate for tolerances in a radial direction.

5. The air intake system according to claim 3, wherein the suction pipe section of the housing has a thickened portion (41) in an area of the collar which receives a respective one of the holding elements and is usable as a stop for the respective sliding sleeve.

6. The air intake system according to claim 5, wherein the inserts are held on a housing of the air intake system and are arranged to compensate for tolerances in a radial direction.

7. The air intake system according to claim 2, wherein the housing and the sliding sleeves form the constructional unit comprised of an aluminum alloy, and the inserts comprise an iron-metallic material including thin sheet metal.

8. The air intake system according to claim 7, wherein the inserts extend via a collar to a suction pipe section of the housing, and the collar is held in position by holding elements to affect a form closure.

9. The air intake system according to claim 8, wherein the suction pipe section of the housing has a thickened portion (41) in an area of the collar which receives a respective one of the holding elements and is usable as a stop for the respective sliding sleeve.

10. The air intake system according to claim 1, wherein the sliding sleeves are provided with sealing bodies on sides thereof facing inlet funnels of suction pipe connections.

11. The air intake system according to claim 10, wherein the inserts are held on a housing of the air intake system and are arranged to compensate for tolerances in a radial direction.

12. The air intake system according to claim 11, wherein the inserts extend via a collar to a suction pipe section of the housing and the collar is held in position by holding elements to affect a form closure.

13. The air intake system according to claim 12, wherein the suction pipe section of the housing has a thickened portion in an area of the collar which receives a respective one of the holding elements and is usable as a stop for the respective sliding sleeve.

14. The air intake system according to claim 1, wherein the adjusting device is applied in a plane of the constructional unit extending equidistantly to center planes of the inserts which are spaced from each other.

15. The air intake system according to claim 14, wherein the inserts are held on a housing of the air intake system and are arranged to compensate for tolerances in a radial direction.

16. The air intake system according to claim 15, wherein the inserts extend via a collar to a suction pipe section of the housing and the collar is held in position by holding elements to affect a form closure.

17. The air intake system according to claim 16, wherein the suction pipe section of the housing has a thickened portion in an area of the collar which receives a respective one of the holding elements and is usable as a stop for the respective sliding sleeve.

18. The air intake system according to claim 14, wherein the adjusting device comprises a rotating shaft having a lever surrounding a cylindrical pin of the constructional unit via a slot opening.

19. The air intake system according to claim 18, wherein the housing and the sliding sleeves form the constructional unit comprised of an aluminum alloy, and the inserts comprise an iron-metallic material including thin sheet metal.

20. The air intake system according to claim 19, wherein the sliding sleeves are provided with sealing bodies on sides thereof facing inlet funnels of suction pipe connections.

\* \* \* \* \*